(12) United States Patent
Nakatomi

(10) Patent No.: US 12,360,322 B2
(45) Date of Patent: Jul. 15, 2025

(54) OPTICAL CIRCUIT BOARD

(71) Applicant: KYOCERA Corporation, Kyoto (JP)

(72) Inventor: Yoshinori Nakatomi, Nagahama (JP)

(73) Assignee: KYOCERA Corporation, Kyoto (JP)

( * ) Notice: Subject to any disclaimer, the term of this patent is extended or adjusted under 35 U.S.C. 154(b) by 337 days.

(21) Appl. No.: 17/786,787

(22) PCT Filed: Dec. 4, 2020

(86) PCT No.: PCT/JP2020/045265
§ 371 (c)(1),
(2) Date: Jun. 17, 2022

(87) PCT Pub. No.: WO2021/124932
PCT Pub. Date: Jun. 24, 2021

(65) Prior Publication Data
US 2023/0025872 A1 Jan. 26, 2023

(30) Foreign Application Priority Data
Dec. 20, 2019 (JP) .................. 2019-230643

(51) Int. Cl.
*G02B 6/42* (2006.01)
*G02B 6/12* (2006.01)
(Continued)

(52) U.S. Cl.
CPC ............. *G02B 6/4214* (2013.01); *G02B 6/12* (2013.01); *G02B 6/122* (2013.01); *G02B 6/42* (2013.01);
(Continued)

(58) Field of Classification Search
CPC ................... G02B 6/4214; G02B 6/43; G02B 2006/12104; G02B 6/12002;
(Continued)

(56) References Cited

U.S. PATENT DOCUMENTS 6,477,296 B1 * 11/2002 Ogawa ................ G02B 6/4246
385/31
7,352,925 B2 * 4/2008 Okubora ............. G02B 6/4214
385/32
(Continued)

FOREIGN PATENT DOCUMENTS

JP 2008-158440 A 7/2008
JP 2010-128200 A 6/2010
(Continued)

*Primary Examiner* — Michelle R Connelly
(74) *Attorney, Agent, or Firm* — Volpe Koenig

(57) ABSTRACT

An optical circuit board of the present disclosure includes a wiring board and an optical waveguide located on the wiring board. The optical waveguide includes a lower cladding layer, a core located on the lower cladding layer, an upper cladding layer located on the lower cladding layer and covering the core, a first cavity extending from the upper cladding layer to the lower cladding layer and dividing the core, and at least two second cavities extending from the upper cladding layer to the lower cladding layer and located with the core therebetween in plan view. The first cavity has a first opening portion located on the upper cladding layer side and a first bottom portion located on the lower cladding layer side. The second cavities each include a second opening portion located on the upper cladding layer side and a second bottom portion located on the lower cladding layer side.

10 Claims, 3 Drawing Sheets

(51) Int. Cl.
 *G02B 6/122* (2006.01)
 *G02B 6/43* (2006.01)
(52) U.S. Cl.
 CPC ............ *G02B 6/4224* (2013.01); *G02B 6/43* (2013.01); *G02B 6/4249* (2013.01)
(58) Field of Classification Search
 CPC .. G02B 6/12004; G02B 6/428; G02B 6/4224; G02B 6/122; G02B 6/138; G02B 6/42; G02B 6/136; G02B 6/4246
 See application file for complete search history.

(56) References Cited

U.S. PATENT DOCUMENTS

| | | | | |
|---|---|---|---|---|
| 10,025,044 | B1* | 7/2018 | Masuda | G02B 6/4245 |
| 10,168,495 | B1* | 1/2019 | Sagara | G02B 6/122 |
| 10,935,737 | B2* | 3/2021 | Sagara | G02B 6/4214 |
| 2005/0074207 | A1* | 4/2005 | Shioda | G02B 6/122 |
| | | | | 385/123 |
| 2008/0181561 | A1 | 7/2008 | Furuyama | |
| 2010/0000664 | A1* | 1/2010 | Yoshino | G02B 6/4214 |
| | | | | 156/154 |
| 2010/0129026 | A1 | 5/2010 | Hodono | |
| 2016/0187582 | A1* | 6/2016 | Yanagisawa | B29D 11/00663 |
| | | | | 264/1.24 |
| 2016/0246007 | A1* | 8/2016 | Nakagawa | G02B 6/132 |

FOREIGN PATENT DOCUMENTS

| | | |
|---|---|---|
| JP | 2015-102739 A | 6/2015 |
| JP | 2016-126039 A | 7/2016 |

* cited by examiner

OPTICAL CIRCUIT BOARD

TECHNICAL FIELD

The present disclosure relates to an optical circuit board.

BACKGROUND ART

Optical communication networks capable of communicating large amounts of data at high speed have been expanding in recent years, and there are various optical communication devices utilizing such optical communication networks. Such devices are equipped with an optical circuit board in which an optical waveguide is connected to a board as described in, for example, Patent Document 1.

CITATION LIST

Patent Literature

Patent Document 1: JP 2010-128200A

SUMMARY

An optical circuit board according to the present disclosure includes a wiring board and an optical waveguide located on a surface of the wiring board. The optical waveguide includes a lower cladding layer, a core located on the lower cladding layer, an upper cladding layer located on the lower cladding layer and covering the core, a first cavity extending from the upper cladding layer to the lower cladding layer and dividing the core, and at least two second cavities extending from the upper cladding layer to the lower cladding layer and located with the core therebetween as viewed in a plan view. The first cavity includes a first opening portion located on the upper cladding layer side and a first bottom portion located on the lower cladding layer side. The second cavities each include a second opening portion located on the upper cladding layer side and a second bottom portion located on the lower cladding layer side. A first straight line connecting the center of the second opening portion and the center of the second bottom portion is inclined with respect to a thickness direction of the optical waveguide.

The optical element mounted module according to the present disclosure includes the optical circuit board described above and an optical element located on the optical circuit board.

DESCRIPTION OF EMBODIMENTS

Figure 1A:
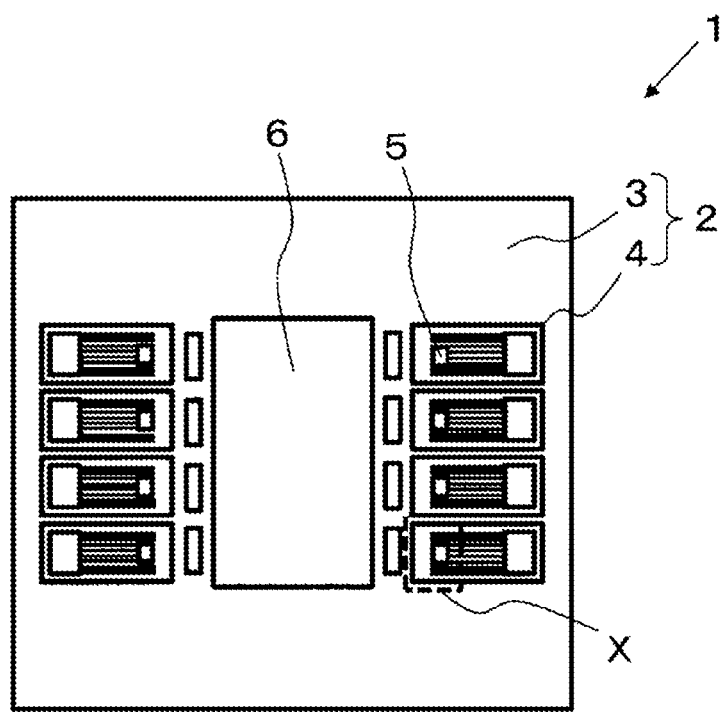
FIG. 1A is a top view illustrating an optical element mounted module including an optical circuit board according to an embodiment of the present disclosure.

As described in Patent Document 1, the optical circuit board has an alignment mark for clarifying the mounting position when mounting the optical element. When a mirror is formed in an optical waveguide provided in the optical circuit board, for example, a through hole penetrating from the upper cladding layer to the lower cladding layer is formed by an excimer laser, and the mirror is formed at one time in each of a plurality of cores sandwiched between the upper cladding layer and the lower cladding layer. In such a case, the position of the mirror may be shifted from the assumed position due to, for example, warpage of the optical circuit board. Therefore, if the optical element is mounted with reference to an alignment mark provided in advance, the position of the mirror and the position of the optical element may be misaligned. That is, it becomes difficult to align the mounting position of the optical element with reference to the alignment mark, and the loss increases during the transmission of optical signals.

As described above, the optical circuit board of the present disclosure includes at least two second cavities extending from the upper cladding layer to the lower cladding layer and located with a core therebetween when viewed in a plan view. Therefore, even if the alignment mark is not provided in advance, the second cavity, which is a type of cavity, can be used as the alignment mark when mounting the optical element. Since the second cavity is only a type of cavity, it is possible to mount the optical element with higher accuracy than when a typical alignment mark provided in advance is used as a reference in relation to the first cavity formed in the region where the optical element is mounted.

Furthermore, in the second cavity, the first straight line connecting the center of the second opening portion and the center of the second bottom portion is inclined with respect to the thickness direction of the optical waveguide. Therefore, when the second cavity is viewed in a plan view, the second bottom portion is located away from the second opening portion. In other words, the second bottom portion is not visually recognized from the second opening portion. As a result, the effect of light reflected by, for example, a conductor layer in contact with the lower cladding layer is less likely to be received by a camera for alignment. Therefore, the recognizability of the second cavity can be improved when mounting the optical element.

An optical circuit board according to an embodiment of the present disclosure will be described with reference to FIGS. 1A and 1B to 3A and 3B. An optical element mounted module 1 according to an embodiment illustrated in FIGS. 1A to 1B includes an optical circuit board 2 and a CPU 6 according to an embodiment of the present disclosure.

The optical circuit board 2 according to the embodiment includes a wiring board 3 and an optical waveguide 4 located on the wiring board 3. The wiring board 3 is not specifically illustrated, but examples thereof include a wiring board having a general build-up structure. Specifically, a wiring board having the build-up structure includes a core substrate and build-up layers layered on both surfaces of the core substrate. The core substrate is not particularly limited as long as the core substrate is formed of a material having an insulating property. Examples of the material having an insulating property include resins such as an epoxy resin, a bismaleimide-triazine resin, a polyimide resin, and a polyphenylene ether resin. Two or more of these resins may be mixed and used.

The core substrate may contain a reinforcing material. Examples of the reinforcing material include insulating fabric materials such as glass fiber, glass non-woven fabric, aramid non-woven fabric, aramid fiber, and polyester fiber. Two or more types of reinforcing materials may be used in combination. Further, an inorganic insulating filler made of, for example, silica, barium sulfate, talc, clay, glass, calcium carbonate, titanium oxide, or the like may be dispersed in the core substrate. The thickness of the core substrate is not particularly limited and is, for example, 200 μm or more and 2000 μm or less.

Generally, a through hole conductor is located in the core substrate to electrically connect the upper and lower surfaces of the core substrate. The through hole conductor is located in a through hole passing through the upper and lower surfaces of the core substrate. The through hole conductor is formed of a conductor made of metal plating such as copper plating, for example. The through hole conductor is connected to conductor layers formed on both surfaces of the core substrate. A land may be included in the conductor layers. The through hole conductor may be formed only on an inner wall surface of the through hole or may fill the through hole.

The build-up layers are layered on both surfaces of the core substrate respectively. As with the core substrate, insulating layers included in the build-up layers are not particularly limited as long as the insulating layers are formed of a material having an insulating property. Examples of the material having an insulating property include resins such as an epoxy resin, a bismaleimide-triazine resin, a polyimide resin, and a polyphenylene ether resin. Two or more of these resins may be mixed and used. When two or more insulating layers are present in the build-up layers, the insulating layers may be formed of the same resin or may be formed of different resins. The insulating layers included in the build-up layers and the core substrate may be formed of the same resin or may be formed of different resins.

Further, an inorganic insulating filler made of, for example, silica, barium sulfate, talc, clay, glass, calcium carbonate, titanium oxide, or the like may be dispersed in the insulating layers included in the build-up layers. The thickness of the insulating layers included in the build-up layers is not particularly limited and is, for example, 5 μm or more and 100 μm or less. When two or more insulating layers are present in the build-up layers, the respective insulating layers may have the same thickness or may have different thicknesses.

Generally, a via hole conductor for electrically connecting layers is formed in the insulating layers included in the build-up layers. The via hole conductor is located in a via hole passing through the upper and lower surfaces of the insulating layers included in the build-up layer. The via hole conductor is formed of a conductor made of metal plating such as copper plating, for example. The via hole conductor is connected to the conductor layers formed on both surfaces of the insulating layers included in the build-up layers. A land may be included in the conductor layers. The via hole conductor may be formed only on an inner wall surface of the via hole or may fill the via hole.

Figure 1B:
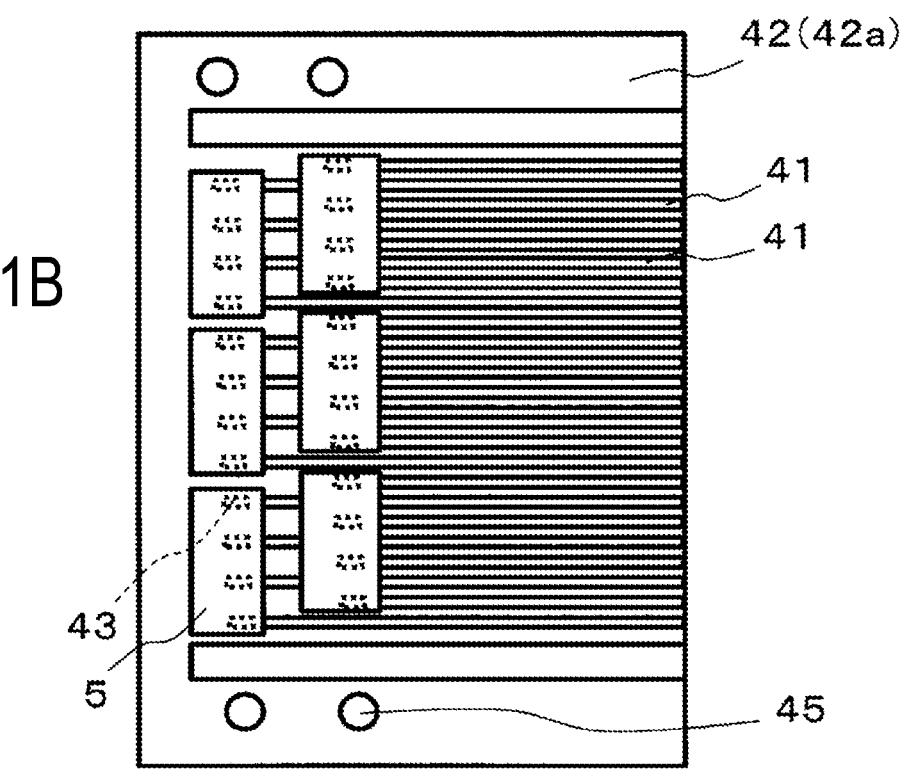
FIG. 1B is an enlarged explanatory diagram of a case in which an upper cladding of an optical waveguide is removed and viewed in a plan view in a region X illustrated in FIG. 1A.
Figure 2:
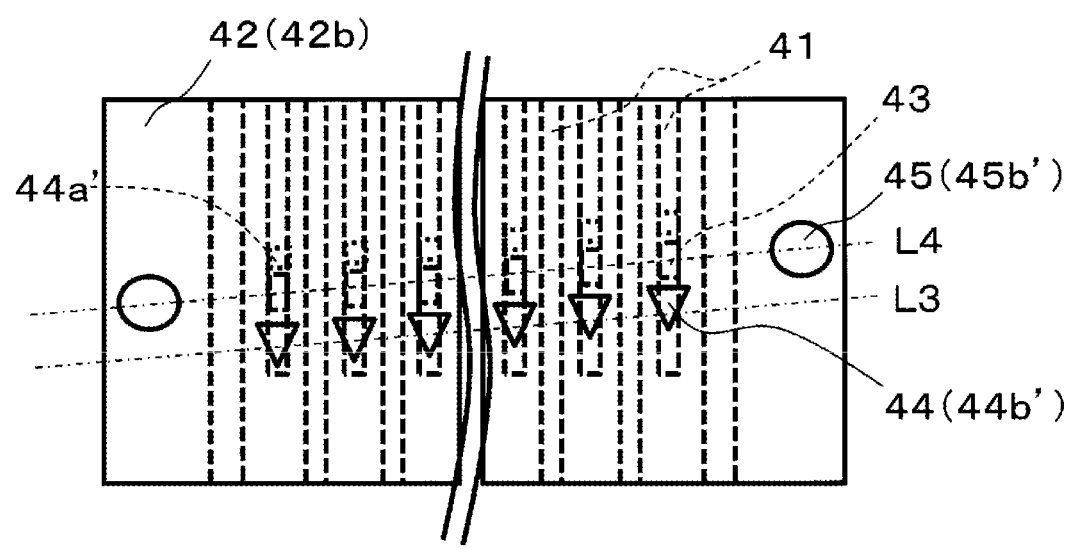
FIG. 2 is an enlarged explanatory diagram of a case in which an optical element mounted in the optical waveguide is removed and viewed in a plan view in the region X illustrated in FIG. 1A.

The optical waveguide 4 is located on the upper surface of the wiring board 3. As illustrated in FIGS. 1B and 2, the optical waveguide 4 includes a core 41, cladding layers 42, and a reflective mirror portion 43. The optical waveguide 4 may be provided via, for example, a conductor layer located on the upper surface of the wiring board 3.

The core 41 included in the optical waveguide 4 acts as an optical path, and light that has entered the optical waveguide 4 is transmitted while being refracted repeatedly on side surfaces and upper and lower surfaces of the core 41. The material of the core 41 is not limited, and is appropriately set in consideration of, for example, the transmission properties of the light, the wavelength characteristics of the light passing through the core 41, and the like. Examples of the material include an epoxy resin and a polyimide resin. The refractive index of the resin that is the material of the core 41 is greater than the refractive index of the resin that is the material of the cladding layers 42, and the light in the core 41 is transmitted while being refracted repeatedly at the boundaries between the core 41 and the cladding layers 42.

The cladding layers 42 included in the optical waveguide 4 include a lower cladding layer 42a and an upper cladding layer 42b. The core 41 is located on the upper surface of the lower cladding layer 42a, and the upper cladding layer 42b covers the upper surface of the lower cladding layer 42a and the core 41. The material of the cladding layer 42 is not limited, and examples thereof include an epoxy resin and a polyimide resin. The cladding layers 42 may have a thickness of, for example, 10 μm or more and 20 μm or less. The lower cladding layer 42a and the upper cladding layer 42b may have the same thickness or may have different thicknesses.

The reflective mirror portion 43 included in the optical waveguide 4 extends over the upper cladding layer 42b, the core 41, and the lower cladding layer 42a. The reflective mirror portion 43 is a divided surface of the core 41 divided during the formation of a first cavity 44. The reflective mirror portion 43 is typically not parallel to the thickness direction of the optical waveguide 4, and has an inclination with respect to the thickness direction. The inclination angle is appropriately set in accordance with an optical element 5 connected to the optical waveguide 4, and the angle formed by the core 41 and the reflective mirror portion 43 is, for example, approximately 35° or more and 55° or less. The first cavity 44 may penetrate or may not penetrate from the upper surface of the upper cladding layer 42b to the lower surface of the lower cladding layer 42a.

The shape of the first opening portions 44b' which are opening portions of the first cavity 44, that is, the shape of the first opening portions 44b' when the upper cladding layer 42b is viewed in a plan view, is not particularly limited. In FIG. 2, the first opening portions 44b' each have a triangular shape. However, the first opening portions 44b' may have a polygonal shape such as a triangular shape, a quadrilateral shape, a pentagonal shape, or a hexagonal shape (the polygonal shape includes a polygonal shape in which each vertex is rounded), a circular shape, an elliptical (oval) shape, or the like.

As illustrated in FIG. 2, typically, a plurality of cores 41 are located in one optical waveguide 4, and the first cavity 44 is formed in each core 41. In such cases, the first opening portions 44b' may all have an identical shape, and at least some first opening portions 44b' may have different shapes.

The optical waveguide 4 includes a second cavity 45 separately from the first cavity 44. As with the first cavity 44, the second cavity 45 extends from the upper surface of the upper cladding layer 42b to the lower cladding layer 42a, and when the optical waveguide 4 is viewed in a plan view, at least two second cavities 45 are located with the core 41 therebetween. In other words, the respective second cavities 45 are located sandwiching a plurality of cores 41. Each of the second cavities 45 may penetrate or may not penetrate from the upper surface of the upper cladding layer 42b to the lower surface of the lower cladding layer 42a.

The second cavity 45 is used as an alignment mark when mounting the optical element 5 on the optical waveguide 4. Therefore, in consideration of the visibility, when the optical waveguide 4 is viewed in a plan view, the plane area of the second cavity 45 is greater than the plane area of the first cavity 44. Second opening portions 45b' that are opening portions of the second cavity 45 each have a circular shape in FIGS. 1B and 2. However, the second opening portions 45b' may have a polygonal shape such as a triangular shape, a quadrilateral shape, a pentagonal shape, or a hexagonal shape (the polygonal shape includes a polygonal shape in which each vertex is rounded), a circular shape, an elliptical (oval) shape, or the like. As with the first opening portions 44b', the second opening portions 45b' may all have an identical shape, and at least some second opening portions 45b' may have different shapes.

Figure 3A:
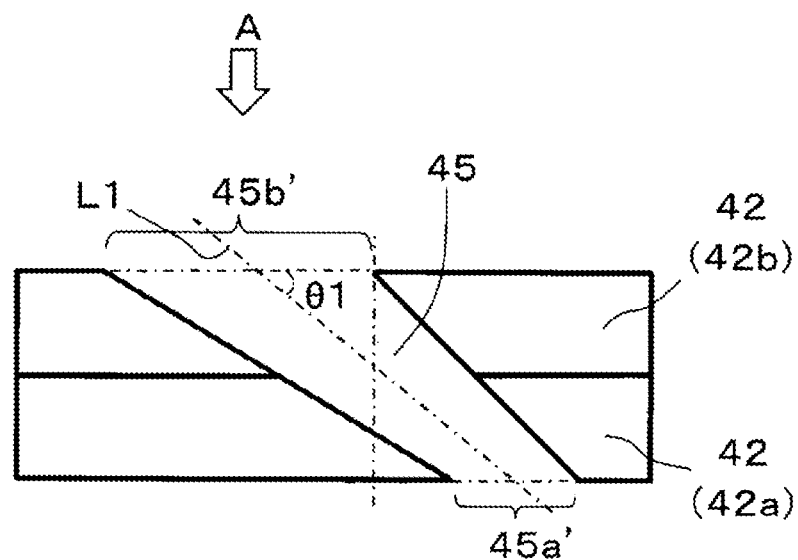
FIG. 3A is an explanatory diagram for explaining an embodiment of a second cavity formed in the optical waveguide illustrated in FIG. 1A.
Figure 3B:
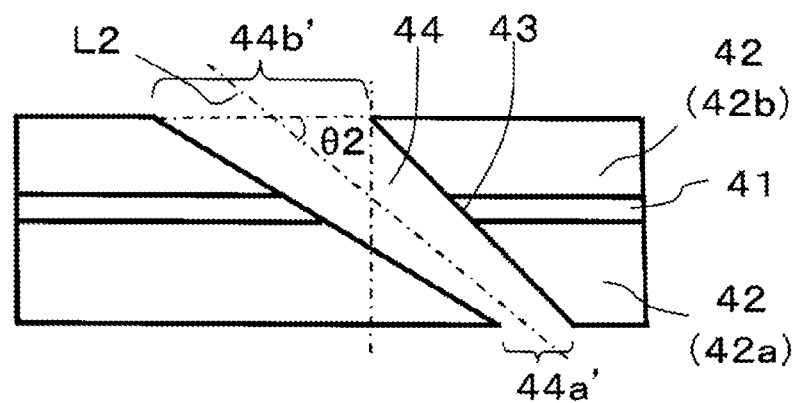
FIG. 3B is an explanatory diagram for explaining an embodiment of a first cavity.

As illustrated in FIG. 3A, in the second cavity 45, a first straight line L1 connecting the center of the second opening portion 45b' and the center of a second bottom portion 45a', which is a bottom portion of the second cavity 45 and is located on the lower cladding layer 42a side, is inclined with respect to the thickness direction of the optical waveguide 4 (i.e., the angle θ1 illustrated in FIG. 3A to 3B is an acute angle instead of 90 degrees). The angle θ1 is set as appropriate depending on the size of the optical waveguide 4 and the like, and is, for example, approximately 30° or more and 60° or less. In the present disclosure, the thickness direction of the optical waveguide 4 refers to a direction that vertically connects the upper surface of the upper cladding layer 42b and the lower surface of the lower cladding layer 42a. The term "center" refers to the center of gravity when, for example, the respective opening portions are viewed in a plan view.

Since the second cavity 45 has such a structure, when the second cavity 45 is viewed in a plan view (when viewed from the direction of the arrow A in FIG. 3A to 3B), the second opening portion 45b' and the second bottom portion 45a' are located away from each other. In other words, it is difficult to visually recognize the second bottom portion 45a' from the second opening portion 45b'. As a result, for example, the camera for alignment is less likely to be affected by the light reflected on the conductor layer in contact with the lower cladding layer 42a, and the recognizability of the second cavity 45 can be improved when mounting the optical element 5.

In particular, as illustrated in FIG. 3A, when the second cavity 45 is viewed cross-sectionally, the second bottom portion 45a' is preferably present at a position not visible from the second opening portion 45b'. Furthermore, when the second cavity 45 is viewed in a plan view, the plane area of the second bottom portion 45a' is preferably less than the plane area of the second opening portion 45b'. Such plane areas can be measured by, for example, observation using a measuring microscope having a measurement function.

As illustrated in FIG. 3B, the first cavity 44 for forming the reflective mirror portion 43 normally has an inclination with respect to the thickness direction, as described above. The inclination angle, that is, the angle θ2 formed by a second straight line L2 connecting the center of the first opening portion 44b' and the center of the first bottom portion 44a' which is the bottom portion of the first cavity 44 and is located on the lower cladding layer 42a side, and the surface of the upper cladding layer 42b, may be identical to the angle θ1 formed by the first straight line L1 connecting the center of the second opening portion 45b' and the center of the second bottom portion 45a' in the second cavity 45 and the surface of the upper cladding layer 42b. The term "identical" here does not mean that the angles are completely identical; the angles are considered identical if the difference is approximately 8° (±8°). The term "center" refers to, for example, the center of gravity when the respective opening portions are viewed in a plan view, as described above.

The positions where the first cavity 44 and the second cavity 45 are disposed are not limited. For example, as illustrated in FIG. 2, when at least two first cavities 44 are formed, a third straight line L3 connecting the first opening portions 44b' of the first cavities 44 and a fourth straight line L4 connecting the second opening portions 45b' of the second cavities 45 may be parallel. When the third straight line L3 and the fourth straight line L4 are parallel, the optical element can be mounted with higher accuracy. Furthermore, the third straight line L3 and the fourth straight line L4 may conform (overlap) to each other.

The third straight line L3 need not necessarily pass through the centers of the first opening portions 44b', and the fourth straight line L4 need not necessarily pass through the centers of the second opening portions 45b'. In view of the size of a typical optical waveguide, the first opening portions 44b' and the second opening portions 45b' may be small, and the third straight line L3 and the fourth straight line L4 may pass through the respective opening portions.

The optical circuit board 2 according to an embodiment is formed, for example, as follows. First, the core substrate is prepared. The core substrate forms a through hole by performing drilling, blasting or laser-machining on an insulating plate such as a double-sided copper clad laminate, and conductor layers are formed in the insulating plate surface and the through hole by a subtractive method. The conductor layers on the upper and lower surfaces of the core substrate are conductive by a through hole conductor which is the conductor layer in the through hole.

Next, the build-up layers are formed on the upper and lower surfaces of the core substrate. The build-up layers are formed by, for example, adhering a thermosetting insulating resin film to the upper and lower surfaces of the core substrate under vacuum and thermally curing the film. Next, laser machining is performed on the build-up layers to form a via hole in which the conductor layer is the bottom portion. After the laser machining, desmear treatment for removing carbide or the like is performed to improve the adhesion strength between the via hole and the via hole conductor.

Next, conductor layers are formed by a copper plated metal in the build-up layer surface and the via hole by a semi-additive method. The conductor layer of the build-up layer surface and the conductor layer at the bottom portion of the via hole are conductive by a via hole conductor which is a conductor layer in the via hole.

A predetermined number of build-up layers can be formed by repeating the step of forming the build-up layer and the step of forming the conductor layer. The build-up layer in the uppermost surface may form a conductor layer at a position where the optical waveguide is formed.

Next, the lower cladding layer 42a is formed by heat treatment after exposure and development of a photosensitive resin film adhered to the conductor layer formed in the build-up layer of the uppermost surface. In so doing, the entire lower portion of the lower cladding layer 42a enters the uniform unevenness of the conductor layer and is brought into close contact with the conductor layer by an anchor effect.

Next, a photosensitive resin film is adhered to the surface of the lower cladding layer 42a. A mask having a predetermined pattern opening is disposed on the resin film, and exposure is performed from above the mask. The resin film of the portion where light passed through the opening is cured. Then, the resin film of the uncured portion is removed by performing development processing, thereby forming the core 41 having a predetermined pattern. Upon exposure, the light emitted from above passes through the opening and illuminates the resin film for the core to cure the resin film.

Next, the upper cladding layer 42b is formed by exposure and development of a photosensitive resin film adhered to cover the surface of the lower cladding layer 42a and the core 41.

Next, parts where the first cavity 44 and the second cavity 45 are formed are irradiated with a laser in order to form these cavities. As the laser, for example, an excimer laser is employed to simultaneously form the first cavity 44 and the second cavity 45. Specifically, the first cavity 44 and the second cavity 45 may be irradiated with an excimer laser with reference to a common alignment mark on the upper surface of the wiring board 3.

In this manner, the optical circuit board 1 according to an embodiment can be formed. By employing the excimer laser, the second cavity 45 used as an alignment mark in mounting the optical element and the first cavity 44 formed in the mounting region of the optical element are formed at the same time. As a result, for example, the third straight line L3 connecting the first cavities 44 described above and the fourth straight line L4 connecting the second cavities 45 can easily be made parallel. In other words, the direction in which the first cavities 44 are arranged and the direction in which the second cavities 45 are arranged are easily aligned. As a result, the optical element can be mounted with higher accuracy by using the second cavities 45 aligned with the alignment of the first cavities 44 as a reference point, as compared to using a typical alignment mark provided in advance.

The optical circuit board of the present disclosure is not limited to the optical circuit board 2 according to the embodiment described above. In the optical circuit board 2 described above, the third straight line L3 connecting the first opening portions 44b' and the fourth straight line L4 connecting the second opening portions 45b' are parallel at a point where the optical element 5 is easily mounted with higher accuracy. However, the third straight line L3 and the fourth straight line L4 do not need to be parallel.

REFERENCE SIGNS LIST

1 Optical element mounted module
2 Optical circuit board
3 Wiring board
4 Optical waveguide
5 Optical element
6 CPU
41 Core
42 Cladding layer
42a Lower cladding layer
42b Upper cladding layer
43 Reflective mirror portion
44 First cavity
44a' First bottom portion
44b' First opening portion
45 Second cavity
45a' Second bottom portion
45b' Second opening portion
L1 First straight line
L2 Second straight line
L3 Third straight line
L4 Fourth straight line

The invention claimed is:

1. An optical circuit board, comprising:
a wiring board; and
an optical waveguide located on the wiring board,
wherein the optical waveguide comprises
a lower cladding layer;
a core located on the lower cladding layer;
an upper cladding layer located on the lower cladding layer and covering the core;
a first cavity extending from the upper cladding layer to the lower cladding layer and dividing the core; and
at least two second cavities extending from the upper cladding layer to the lower cladding layer in an area where no core exists and located with the core therebetween when viewed in a plan view, wherein
the first cavity has a first opening portion located on the upper cladding layer side and a first bottom portion located on the lower cladding layer side,
the second cavities each having a second opening portion located on the upper cladding layer side and a second bottom portion located on the lower cladding layer side, and
a first straight line connecting a center of the second opening portion and a center of the second bottom portion is inclined with respect to a thickness direction of the optical waveguide.

2. The optical circuit board according to claim 1, wherein the optical waveguide is located on the wiring board via a conductor layer.

3. The optical circuit board according to claim 1, wherein when the second cavities are viewed in a plan view, the second bottom portion is located away from the second opening portion.

4. The optical circuit board according to claim 1, wherein a plane area of the second bottom portion is smaller than a plane area of the second opening portion.

5. The optical circuit board according to claim 1, wherein an angle formed by a second straight line connecting a center of the first opening portion and a center of the first bottom portion and a surface of the upper cladding layer is identical to an angle formed by the first straight line and the surface of the upper cladding layer.

6. The optical circuit board according to claim 1, wherein the optical waveguide includes a plurality of the cores and a plurality of the first cavities, at least two of the plurality of cores sandwiched between the second cavities are divided by the first cavity, and
a third straight line connecting the first opening portions of the plurality of the first cavities and a fourth straight line connecting the second opening portions of a plurality of the second cavities are parallel.

7. The optical circuit board according to claim 6, wherein the third straight line and the fourth straight line conform to each other.

8. An optical element mounted module comprising:
the optical circuit board according to claim 1 and
an optical element located on the optical circuit board.

9. The optical circuit board according to claim 1, wherein a mirror portion, which is a divided surface of the core, is included in the first cavity, and the mirror portion is located on a straight line connecting the second opening portions.

10. The optical circuit board according to claim 1, wherein
the area of the second opening portion is larger than the area of the first opening portion.

* * * * *